United States Patent
Dhodapkar et al.

(10) Patent No.: US 7,861,066 B2
(45) Date of Patent: Dec. 28, 2010

(54) MECHANISM FOR PREDICTING AND SUPPRESSING INSTRUCTION REPLAY IN A PROCESSOR

(75) Inventors: Ashutosh S. Dhodapkar, Fremont, CA (US); Michael G. Butler, San Jose, CA (US); Gene W. Shen, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 313 days.

(21) Appl. No.: 11/780,684

(22) Filed: Jul. 20, 2007

(65) Prior Publication Data

US 2009/0024838 A1 Jan. 22, 2009

(51) Int. Cl.
*G06F 9/30* (2006.01)
(52) U.S. Cl. ................... 712/219; 712/214
(58) Field of Classification Search .......... 712/219
See application file for complete search history.

(56) References Cited

U.S. PATENT DOCUMENTS

| | | | |
|---|---|---|---|
| 6,542,984 | B1 | 4/2003 | Keller |
| 6,877,086 | B1 * | 4/2005 | Boggs et al. ............. 712/218 |
| 6,912,648 | B2 * | 6/2005 | Hammarlund et al. ...... 712/219 |
| 6,952,764 | B2 | 10/2005 | Sager |
| 6,981,129 | B1 | 12/2005 | Boggs |
| 7,203,817 | B2 | 4/2007 | Yeh |
| 7,237,093 | B1 * | 6/2007 | Musoll et al. ............. 712/205 |
| 7,457,923 | B1 * | 11/2008 | Chou et al. ............. 711/137 |
| 2002/0091914 | A1 * | 7/2002 | Merchant et al. ............ 712/219 |
| 2002/0091915 | A1 * | 7/2002 | Parady ................ 712/225 |
| 2007/0186080 | A1 * | 8/2007 | Luick .................. 712/214 |

OTHER PUBLICATIONS

R. E. Kessler, E. J. McLellan, and D. A. Webb. "The Alpha 21264 Microprocessor Architecture," International Conference on Computer Design (ICCD'98), pp. 90-95 (Oct. 1998).*
A. Yoaz, M. Erez, R. Ronen, and S. Jourdan. "Speculation Techniques for Improving Load Related Instruction Scheduling", Proceedings of the 26th International Symposium on Computer Architecture (ISCA 26), May 2-4, 1999, pp. 42-53.*
T. C. Mowry, C. Luk. "Predicting data cache misses in non-numeric applications through correlation profiling", Proceedings of the 30th annual ACM/IEEE international symposium on Microarchitecture, 1997, pp. 314-320.*

* cited by examiner

*Primary Examiner*—Jacob Petranek
(74) *Attorney, Agent, or Firm*—Meyertons, Hood, Kivlin, Kowert & Goetzel, P.C.; Stephen J. Curran

(57) ABSTRACT

A mechanism for suppressing instruction replay includes a processor having one or more execution units and a scheduler that issue instruction operations for execution by the one or more execution units. The scheduler may also cause instruction operations that are determined to be incorrectly executed to be replayed, or reissued. In addition, a prediction unit within the processor may predict whether a given instruction operation will replay and to provide an indication that the given instruction operation will replay. The processor also includes a decode unit that may decode instructions and in response to detecting the indication, may flag the given instruction operation. The scheduler may further inhibit issue of the flagged instruction operation until a status associated with the flagged instruction is good.

18 Claims, 3 Drawing Sheets ically identifies the selected register among the architected registers. A source operand is identified by a source register number and a destination operand is identified by a destination register number.

MECHANISM FOR PREDICTING AND SUPPRESSING INSTRUCTION REPLAY IN A PROCESSOR

BACKGROUND OF THE INVENTION

1. Field of the Invention

This invention relates to processors and, more particularly, to instruction scheduling and execution within processors.

2. Description of the Related Art

Superscalar processors attempt to achieve high performance by issuing and executing multiple instructions per clock cycle and by employing the highest possible clock frequency consistent with the design. One method for increasing the number of instructions executed per clock cycle is out of order execution. In out of order execution, instructions may be executed in a different order than that specified in the program sequence (or "program order"). Certain instructions near each other in a program sequence may have dependencies which prohibit their concurrent execution, while subsequent instructions in the program sequence may not have dependencies on the previous instructions. Accordingly, out of order execution may increase performance of the superscalar processor by increasing the number of instructions executed concurrently (on the average). Another method related to out of order execution is speculative execution, in which instructions are executed subsequent to other instructions which may cause program execution to proceed down a different path than the path containing the speculative instructions. For example, instructions may be speculative if the instructions are subsequent to a particular instruction which may cause an exception. Instructions are also speculative if the instructions are subsequent to a predicted conditional branch instruction which has not yet been executed. Similarly, instructions may be out of order or speculatively scheduled, issued, etc.

Unfortunately, scheduling instructions for out of order or speculative execution presents additional hardware complexities for the processor. The term "scheduling" generally refers to selecting an instruction for execution. Typically, the processor attempts to schedule instructions as rapidly as possible to maximize the average instruction execution rate (e.g. by executing instructions out of order to deal with dependencies and hardware availability for various instruction types). These complexities may limit the clock frequency at which the processor may operate. In particular, the dependencies between instructions must be respected by the scheduling hardware. Generally, as used herein, the term "dependency" refers to a relationship between a first instruction and a subsequent second instruction in program order which requires the execution of the first instruction prior to the execution of the second instruction. A variety of dependencies may be defined. For example, a source operand dependency occurs if a source operand of the second instruction is a destination operand of the first instruction.

Generally, instructions may have one or more source operands and one or more destination operands. The source operands are input values to be manipulated according to the instruction definition to produce one or more results (which are the destination operands). Source and destination operands may be memory operands stored in a memory location external to the processor, or may be register operands stored in register storage locations included within the processor. The instruction set architecture employed by the processor defines a number of architected registers. These registers are defined to exist by the instruction set architecture, and instructions may be coded to use the architected registers as source and destination operands. An instruction specifies a particular register as a source or destination operand via a register number (or register address) in an operand field of the instruction. The register number uniquely identifies the selected register among the architected registers. A source operand is identified by a source register number and a destination operand is identified by a destination register number.

In addition to operand dependencies, one or more types of ordering dependencies may be enforced by a processor. Ordering dependencies may be used, for example, to simplify the hardware employed or to generate correct program execution. By forcing certain instructions to be executed in order with respect to certain other instructions, hardware for handling consequences of the out of order execution of the instructions may be omitted. For example, instructions which update special registers containing general processor operating state may affect the execution of a variety of subsequent instructions which do not explicitly access the special registers. Generally, ordering dependencies may vary from microarchitecture to microarchitecture.

While the scheduling mechanism respects dependencies, it is desirable to be as aggressive as possible in scheduling instructions out of order and/or speculatively in an attempt to maximize the performance gain realized. However, the more aggressive the scheduling mechanism (i.e. the fewer conditions which may prevent a particular instruction from being scheduled), the more likely the occurrence of an incorrectly executed instruction becomes. One recovery technique for incorrectly executed instructions is to purge the incorrectly executed instruction and all subsequent instructions from the processor pipeline and to refetch the incorrectly executed instruction (and subsequent instructions). Often, the purging and refetching is delayed from the discovery of incorrect execution for hardware simplicity (e.g. until the incorrectly executed instruction is the oldest instruction in flight). The average number of instructions actually executed per clock cycle is decreased due to the incorrect execution and the subsequent purging events. For aggressive scheduling mechanisms which encounter incorrect execution more frequently, the performance degradation attributable to this type of recovery mechanism may be substantial.

Accordingly, many scheduling mechanisms include another recovery technique for incorrectly executed instructions. In this technique, an instruction operation that is subsequently found to be incorrectly executed may be reissued or "replayed." Thus, the penalty for incorrect execution of instruction operations may be reduced when compared to purging the incorrectly executed instruction operation and younger instruction operations from the pipeline and refetching the instruction operation.

However although there are benefits to reissuing instruction operations, in some cases a reissue mechanism may cause problems. For example, if instruction operations are continually replayed, excess power consumption and performance degradation may result.

SUMMARY

Various embodiments of a mechanism for suppressing instruction replay in a processor are disclosed. In one embodiment, a processor includes one or more execution units configured to execute instruction operations. The processor also includes a scheduler that may be configured to issue the instruction operations for execution by the one or more execution units, and to cause instruction operations that are determined to be incorrectly executed to be replayed, or reissued. In addition, a prediction unit within the processor may predict whether a given instruction operation will replay and to provide an indication that the given instruction operation will replay. The processor also includes a decode unit that may decode instructions and in response to detecting the indication, may flag the given instruction operation. The scheduler may further inhibit issue of the flagged instruction operation until a status associated with the flagged instruction is good.

In one specific implementation, the prediction unit includes a control unit that may predict instruction replay based on an execution history of the given instruction operation using, for example, a hashing function.

Figure 1:
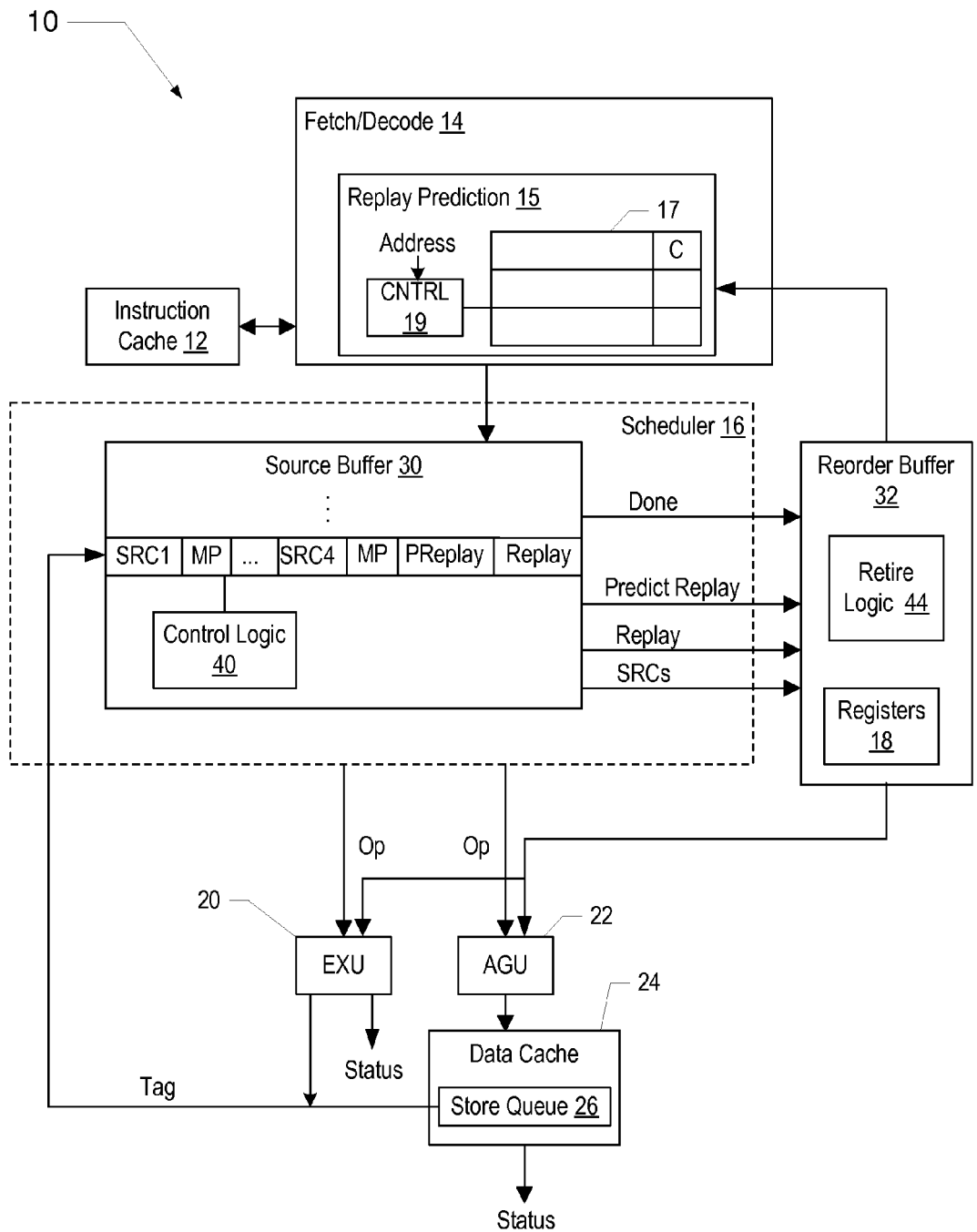
FIG. 1 is a block diagram of one embodiment of a processor including a mechanism for instruction replay suppression.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. It is noted that the word "may" is used throughout this application in a permissive sense (i.e., having the potential to, being able to), not a mandatory sense (i.e., must).

DETAILED DESCRIPTION

Turning now to FIG. 1, a block diagram of one embodiment of a portion of a processor 10 is shown. In the illustrated embodiment, the processor 10 includes an instruction cache 12, a fetch/decode unit 14, a scheduler 16, an execution unit (EXU) 20, an address generation unit (AGU) 22, a data cache 24, and a reorder buffer 32. The instruction cache 12 is coupled to the fetch/decode unit 14, which is coupled to the scheduler 16. The scheduler 16 is further coupled to the reorder buffer 32, the EXU 20, and the AGU 22. The AGU 22 is shown coupled to the data cache 24, which is in turn coupled back to the fetch/decode unit 14, and to the scheduler 16. It is noted that processor 10 may include other components that are well known and are thus not shown or described for simplicity.

The general flow of instructions/instruction operations in the processor 10 will next be described, to provide context for the additional details described below. The fetch/decode unit 14 may fetch instructions from the instruction cache 12 and decode them into instruction operations for the scheduler 16. The fetch/decode unit 14 may implement branch prediction to speculatively fetch down a given path in the code being executed. In some embodiments, the processor 10 may implement register renaming to rename the architectural registers 18 to the physical registers in a register file. If so, the fetch/decode unit 14 may perform the renaming also. Further, in the illustrated embodiment the fetch/decode unit 14 includes a replay prediction unit 15 that may predict whether a fetched instruction will need to be replayed or reissued. In various implementations, the replay prediction unit 15 may be configured to use any of a variety of prediction methods. For example, instruction operation address or instruction pointer information and/or replay history information may be combined using one or more hashing functions such as may be done in some branch prediction schemes. As such, in the illustrated embodiment, the replay prediction unit 15 includes a replay history buffer 17 and a control unit 19. The control unit 19 may include hashing functionality and may be configured to provide the replay prediction information to the fetch/decode unit 14.

As will be described in greater detail below, if the replay prediction unit 15 determines that an instruction operation will be replayed, the fetch/decode unit 14 may flag the instruction operation. In this way, the dependent instructions may not be issued until the source instruction status is known to be good.

The scheduler 16 receives the instruction operations dispatched by the fetch/decode unit 14, and may monitor source operands of a given instruction operation to determine when it can be scheduled. The scheduler 16 may schedule the instruction operation, but may retain the instruction operation in case a replay event is detected. Generally as described above, replay may comprise any mechanism which, indicates that the instruction may not have produced a correct result in execution, and permits that instruction operation to be re-executed without refetching the instruction (and subsequent instructions in program order) from the instruction cache and/or memory. The scheduler 16 may be a centralized buffer which schedules all instructions, or may be distributed to execution resources (e.g. reservation stations). Scheduled instruction operations are transmitted to the EXU 20 or the AGU 22, in this embodiment.

In the illustrated embodiment, the scheduler 16 includes the source buffer 30 to store the source register addresses for the source operands of each instruction operation. That is, each instruction operation in the scheduler 16 may be assigned an entry in the source buffer 30. An additional buffer (not shown) may store other information, such as the instruction operation itself, or that information may be also be stored in the source buffer 30.

An exemplary source buffer entry 38 is shown in FIG. 1, and may include one or more source register addresses (e.g. up to four source addresses for a given instruction operation, labeled SRC1 to SRC4, although other embodiments may have more or fewer source operands per instruction operation). Additionally, a matched-previously (MP) bit may be maintained for each source operand, indicating that the source has previously matched a tag and thus is resolved. Each entry 38 in the source buffer 30 may also include a predict replay bit (shown as PReplay in FIG. 1) and a Replay bit. As described above, the PReplay bit may indicate that the corresponding instruction is a source instruction that has been identified as predicted to replay. Similarly, the Replay bit may indicate whether the source instruction has actually replayed.

The EXU 20 may comprise circuitry to execute arithmetic, logic, shift, and other non-memory operations. Specifically, in one embodiment, the EXU 20 may be configured to execute integer operations. Floating point operations may be executed in a floating point unit (not shown). The EXU 20 may receive source operands from the register file 18 and the operation to execute from the scheduler 16. As mentioned previously, operand forwarding may also be supported via an operand forwarding network (not shown). The EXU 20 may broadcast the tag of the instruction operation (which identifies the destination of the instruction operation in the register file 18 and thus can be compared to the source operands) to the scheduler 16 so that dependent operations may be scheduled and may receive the execution result. Additionally, the EXU 20 may issue the tags of the operation to the scheduler 16 so that dependent operation entries within the source buffer 30 may be updated. Similarly, the data cache 24 may issue tags of memory operations being executed. The AGU 22 may receive operands and the memory operation, and may generate the address of the memory location accessed by the load/store operation. The address is provided to the data cache 24 for access.

The data cache 24 is configured to determine if a load operation hits in the cache, and is configured to transmit status indicating whether the data speculation that was performed to forward the data for the operation was correct. The status may indicate bad (data speculation incorrect) or good (data speculation correct). Data speculation may be incorrect if the load misses in the cache, or if translation is enabled and a translation lookaside buffer (TLB) miss is detected. Additionally, data speculation may be incorrect if the load hits a store in the store queue 26 (shown in the data cache block 24 in FIG. 1, although the store queue may be physically separate from the data cache 24) and the store data cannot be forwarded to satisfy the load. For example, the store data may not have been provided yet, or the store may not update all of the bytes accessed by the load (and thus some bytes from the store queue and some bytes from the cache or memory are needed to complete the load).

Once a given instruction operation's source operands have all been resolved, the instruction operand may request scheduling. The scheduler 30 also includes control logic 40, which may detect that the instruction operation in entry 38 has resolved its sources and may generate a request to schedule (not shown). More particularly, in one embodiment, the source register address fields in the entry may comprise content addressable memory (CAM), and a match may be detected using the CAM to compare between a tag broadcast from the execution resources and the stored register address. The control logic 40 may detect that all source operands are resolved to make the request. The MP bit may also be set when the match is detected. If an instruction operation has been scheduled, a picked ("P") bit may be set to prevent subsequent requests for that instruction operation. Thus, a request may be made if all source operands have been resolved and the instruction operation has not be previously picked.

As shown, reorder buffer 32 may include retire logic 44 and architectural registers 18. The reorder buffer 32 may facilitate register renaming as well as maintaining architectural state by maintaining instructions until they complete and are retired. Further, each time an instruction completes, source buffer 30 may notify the reorder buffer 32 of the completion with a done message. In response, retire logic 44 may retire the instruction and notify replay prediction unit 15 of the successful completion of the instruction operation.

The term instruction operation may generally refer to any operation that execution resources within the processor 10 may execute. Instruction operations may have a one-to-one mapping to instructions specified in an instruction set architecture that is implemented by the processor 10. The instruction operations may be the same as the instructions, or may be in decoded form. Alternatively, instructions in a given instruction set architecture (or at least some of the instructions) may map to two or more instruction operations. In some cases, microcoding may be implemented and the mapping may comprise a microcode routine stored in a microcode read-only memory (MROM). In other cases, hardware may generate the instruction operations, or a combined approach of hardware generation and microcoding may be used. Load instruction operations may correspond to explicit load instructions or may be implicit in an instruction that specified a memory source operand to be read by the processor. Similarly, store instruction operations may correspond to explicit store instructions or may be implicit in an instruction that specified a memory destination operand to be written by the processor.

Execution resources may generally refer to any hardware circuitry that performs all or part of the execution of an instruction operation. For example, the EXU 20, the AGU 22, and the data cache 24 may comprise execution resources. An execution resource may be designed to accept one or more instruction operations per clock cycle. There may be any number of various types of execution resources in various embodiments. Thus, the source buffer 30 may be configured to receive and resolve multiple tag broadcasts per clock cycle.

The instruction cache 12 and the data cache 24 may comprise any configuration (set associative, direct mapped, etc.) and any desired capacity. An external interface unit (not shown) may coordinate the fetching of data/instructions into the caches when a cache miss occurs.

The buffers 17, 30 and 32 may comprise any type of memory. In one embodiment, the memory may comprise RAM and/or CAM, or a combination thereof. Some or all of the control logic 40 may be part of the CAM, or may be logic separate from the memory or integrated into the circuitry forming the memory.

Figure 2:
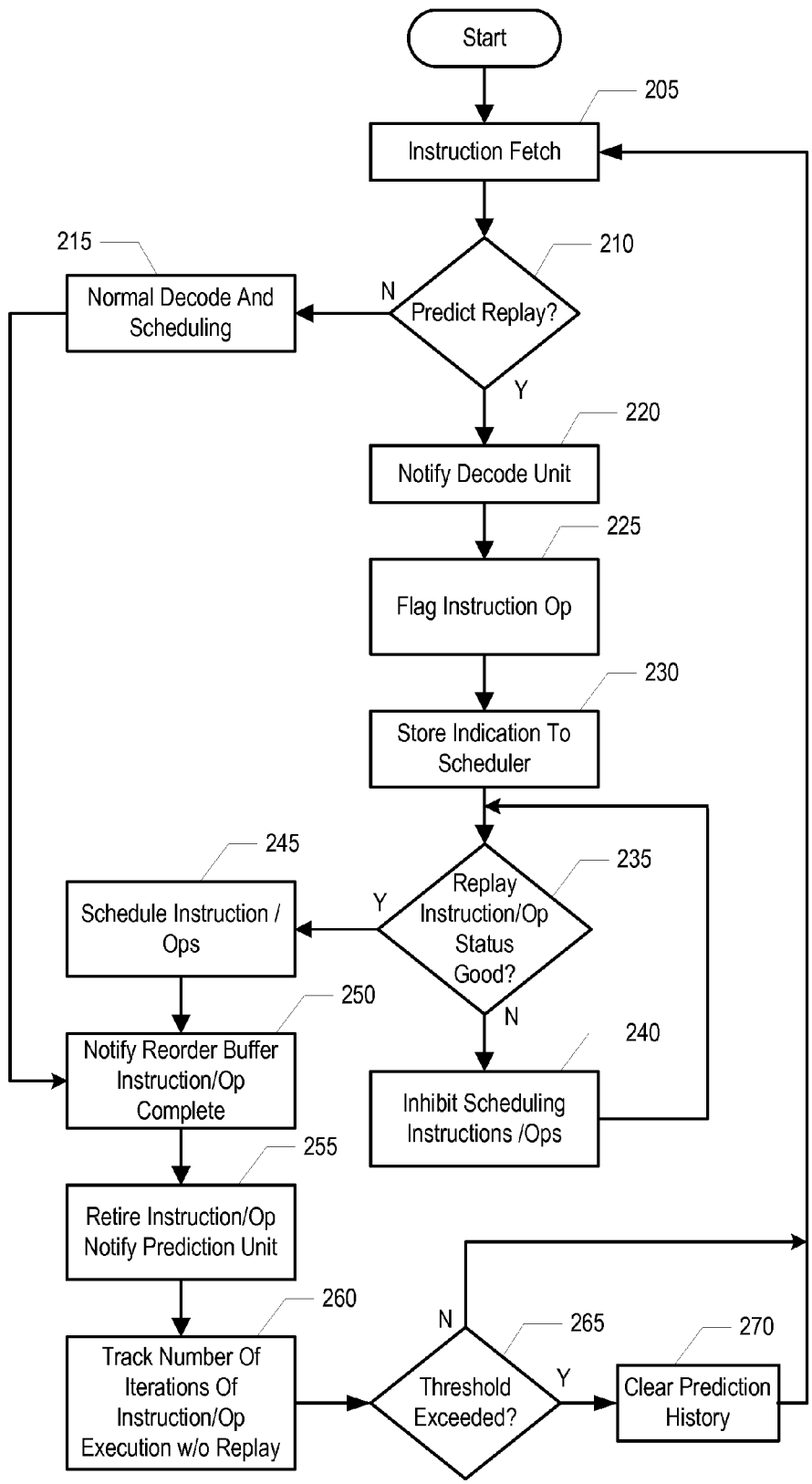
FIG. 2 is a flow diagram describing the operation of the embodiment of the processor of FIG. 1.

Turning to FIG. 2, a flow diagram describing the operation of one embodiment of the processor of FIG. 1 is shown. Instructions may be fetched from instruction cache or memory by fetch/decode unit 14 (block 205). As fetched instructions are being decoded into instruction operations, the instruction address may be provided to replay prediction unit 15. Replay prediction unit 15 may predict whether the instruction will need to replay. In one embodiment, control unit 19 may use the address and any prediction history that may be stored in the prediction history buffer 17 to make a replay prediction (block 210). For example, in one specific implementation, control unit 19 may perform a hash of the address and the information in the buffer 17 to index into prediction information (e.g., saturating counters (not shown)) stored within control unit 19. However, it is contemplated that in other embodiments, other prediction methods may be used.

If replay prediction unit 15 determines the instruction operation will not replay, the instruction may be sent to scheduler 16 for normal decode, scheduling and execution (block 215). When the instruction operation completes, scheduler 16 may notify the reorder buffer 32, of the successful completion (block 250). In response, reorder buffer 32, may retire the instruction operation and notify the replay prediction unit 15 of the successful execution (block 255). If the instruction had previously been predicted to be replayed and is being tracked by the replay prediction unit 15, replay prediction unit 15 may keep track of the number of successful iterations (i.e., iterations without a replay) of an instruction operation that was previously predicted to replay (block 260). In one embodiment, each entry within prediction history buffer 17 includes a counter (shown as C in FIG. 1). Each time one of the instructions being monitored executes without a replay the counter may be incremented. Control unit 19 may monitor the count value of each entry (block 265) and if the count value reaches a predetermined threshold, control unit 19 may clear the prediction history for that entry (block 270). Operation proceeds as described above in block 205, where the next instruction is fetched. Similarly, if the threshold has not been reached (block 265) operation proceeds as described above in block 205, where the next instruction is fetched.

However, referring back to block 210, if replay prediction unit 15 determines the instruction operation will replay, control unit 19 notifies decode logic within fetch/decode unit 14 (block 220). In response, fetch decode unit 14 flags the instruction operation (block 225). For example, in one embodiment, one or more instruction bits may be used to flag the instruction. The bits may be unused instruction bits, or in various embodiments currently used bits may be encoded to include an encoding that identifies the instruction operation as an operation that will replay.

The flagged instruction operation is sent to scheduler 16. As described above, the instruction operations may be stored within scheduler 16. In one embodiment, the instruction operations may be stored within buffer 30, or alternatively in another buffer (not shown). Control logic 40 may also store within an entry 38 of buffer 30 an indication that the corresponding instruction operation is predicted to replay (block 230). For example, as described above, the PReplay bit may be set (or cleared) to indicate the corresponding instruction operation may replay.

During execution scheduling of instruction operations, scheduler 16 checks the status of the instructions that it is attempting to schedule (block 235). If the status for the source instruction is not good, meaning, for example, there may be dependencies that have not resolved, scheduler 16 may inhibit scheduling any instruction operation that has been flagged as a replay instruction (block 240).

If the condition causing the replay is resolved and the status for the replay instruction changes to good, scheduler 16 may clear the PReplay bit and/or the Replay bit in the entry corresponding to the instruction operation that now has a good status. Scheduler 16 may then schedule the instruction operation and its dependent instruction operations for execution (block 245). When the instruction operation completes, scheduler 16 may notify the reorder buffer 32, of the successful completion (block 250). In response, reorder buffer 32, may retire the instruction operation and notify the replay prediction unit 15 of the successful execution (block 255). In addition, if the instruction operation does actually replay, the replay bit is set in the entry corresponding to the instruction operation, and the scheduler 16 notifies the reorder buffer 32 that the instruction operation did replay.

As described above, replay prediction unit 15 may keep track of the number of successful iterations (i.e., iterations without a replay) of an instruction operation that was previously predicted to replay. Accordingly, operation proceeds as described above in conjunction with the description of block 260.

Figure 3:
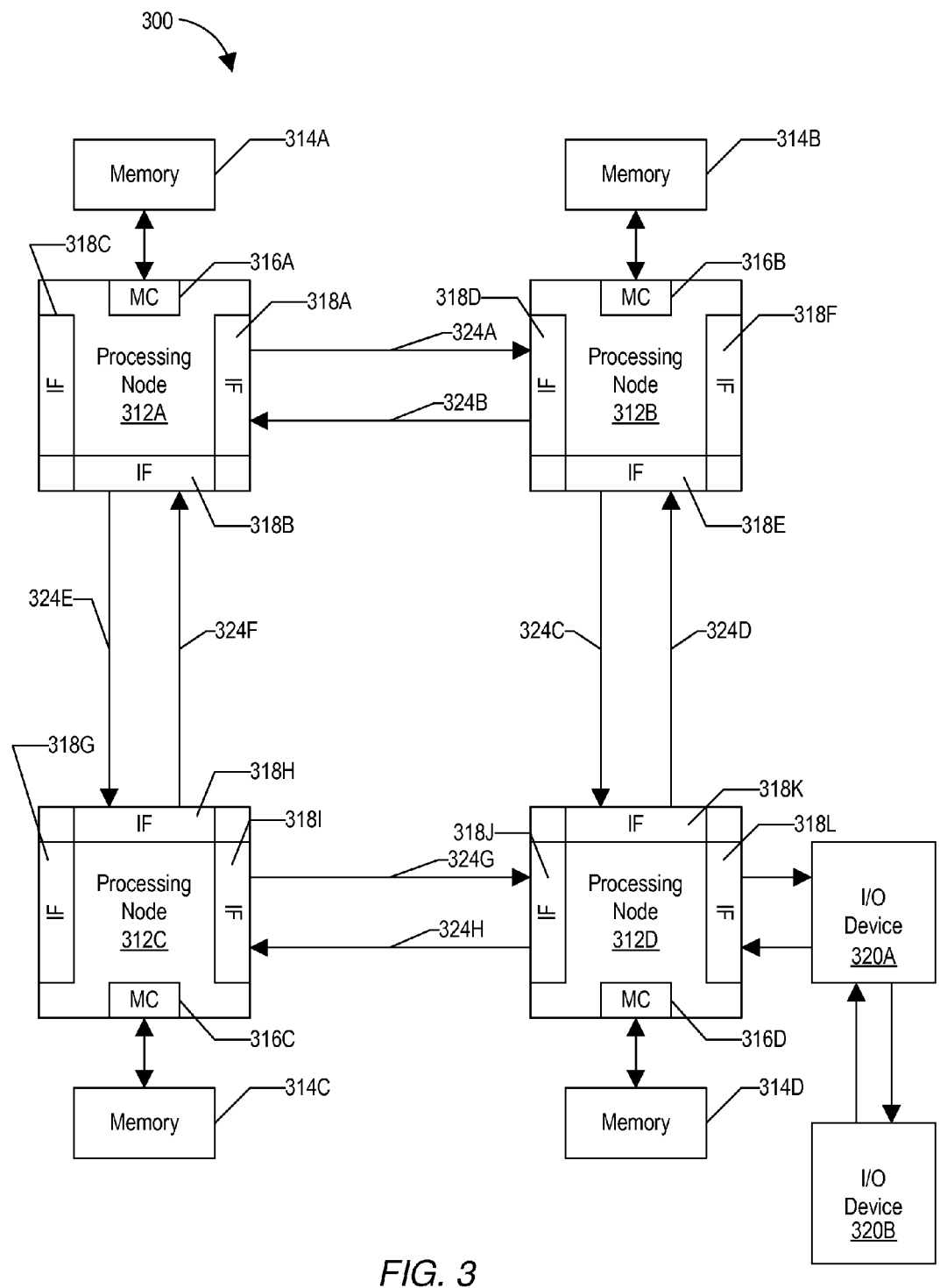
FIG. 3 is a computer system including the processor of FIG. 1.

Referring to FIG. 3, an embodiment of a computer system 300 is shown. In the embodiment of FIG. 3, computer system 300 includes several processing nodes 312A, 312B, 312C, and 312D. Each processing node is coupled to a respective memory 314A-314D via a memory controller 316A-316D included within each respective processing node 312A-312D. Additionally, processing nodes 312A-312D include interface logic used to communicate between the processing nodes 312A-312D. For example, processing node 312A includes interface logic 318A for communicating with processing node 312B, interface logic 318B for communicating with processing node 312C, and a third interface logic 318C for communicating with yet another processing node (not shown). Similarly, processing node 312B includes interface logic 318D, 318E, and 318F; processing node 312C includes interface logic 318G, 318H, and 318I; and processing node 312D includes interface logic 318J, 318K, and 318L. Processing node 312D is coupled to communicate with a plurality of input/output devices (e.g. devices 320A-320B in a daisy chain configuration) via interface logic 318L. Other processing nodes may communicate with other I/O devices in a similar fashion.

Processing nodes 312A-312D implement a packet-based link for inter-processing node communication. In the present embodiment, the link is implemented as sets of unidirectional lines (e.g. lines 324A are used to transmit packets from processing node 312A to processing node 312B and lines 324B are used to transmit packets from processing node 312B to processing node 312A). Other sets of lines 324C-324H are used to transmit packets between other processing nodes as illustrated in FIG. 6. Generally, each set of lines 324 may include one or more data lines, one or more clock lines corresponding to the data lines, and one or more control lines indicating the type of packet being conveyed. The link may be operated in a cache coherent fashion for communication between processing nodes or in a noncoherent fashion for communication between a processing node and an I/O device (or a bus bridge to an I/O bus of conventional construction such as the Peripheral Component Interconnect (PCI) bus or Industry Standard Architecture (ISA) bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 312A to processing node 312D may pass through either processing node 312B or processing node 312C as shown in FIG. 3. Any suitable routing algorithm may be used. Other embodiments of computer system 300 may include more or fewer processing nodes then the embodiment shown in FIG. 3.

Generally, the packets may be transmitted as one or more bit times on the lines 324 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 312A-312D, in addition to a memory controller and interface logic, may include one or more processors. Broadly speaking, a processing node comprises at least one processor and may optionally include a memory controller for communicating with a memory and other logic as desired. More particularly, each processing node 312A-312D may comprise one or more copies of processor 10 as shown in FIG. 1. One or more processors may comprise a chip multiprocessing (CMP) or chip multithreaded (CMT) integrated circuit in the processing node or forming the processing node, or the processing node may have any other desired internal structure.

Memories 314A-314D may comprise any suitable memory devices. For example, a memory 314A-314D may comprise one or more RAMBUS DRAMs (RDRAMs), synchronous DRAMs (SDRAMs), DDR SDRAM, static RAM, etc. The address space of computer system 300 is divided among memories 314A-314D. Each processing node 312A-312D may include a memory map used to determine which addresses are mapped to which memories 314A-314D, and hence to which processing node 312A-312D a memory request for a particular address should be routed. In one embodiment, the coherency point for an address within computer system 300 is the memory controller 316A-316D coupled to the memory storing bytes corresponding to the address. In other words, the memory controller 316A-316D is responsible for ensuring that each memory access to the corresponding memory 314A-314D occurs in a cache coherent fashion. Memory controllers 316A-316D may comprise control circuitry for interfacing to memories 314A-314D. Additionally, memory controllers 316A-316D may include request queues for queuing memory requests.

Generally, interface logic 318A-318L may comprise a variety of buffers for receiving packets from the link and for buffering packets to be transmitted upon the link. Computer system 300 may employ any suitable flow control mechanism for transmitting packets. For example, in one embodiment, each interface logic 318 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 320A-320B may be any suitable I/O devices. For example, I/O devices 320A-320B may include devices for communicating with another computer system to which the devices may be coupled (e.g. network interface cards or modems). Furthermore, I/O devices 320A-320B may include video accelerators, audio cards, hard or floppy disk drives or drive controllers, SCSI (Small Computer Systems Interface) adapters and telephony cards, sound cards, and a variety of data acquisition cards such as GPIB or field bus interface cards. Furthermore, any I/O device implemented as a card may also be implemented as circuitry on the main circuit board of the system 300 and/or software executed on a processing node. It is noted that the term "I/O device" and the term "peripheral device" are intended to be synonymous herein.

It is further noted that the processor 10 shown in FIG. 1 may be implemented in a more traditional personal computer (PC) system structure including one or more interfaces of the processors to a bridge to one or more I/O interconnects and/or memory.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processor comprising:
   one or more execution units configured to execute instruction operations;
   a scheduler coupled to the one or more execution units and configured to issue the instruction operations for execution by the one or more execution units, and to cause instruction operations that are determined to be incorrectly executed to be replayed;
   a prediction unit configured to predict, prior to execution, whether a given instruction operation will replay based on an execution history of the given instruction operation, and to provide an indication that the given instruction operation will replay;
   a decode unit coupled to the scheduler and configured to decode instructions, wherein in response to detecting the indication, the decode unit is further configured to flag the given instruction operation by asserting one or more instruction opcode bits of the given instruction operation;
   wherein the scheduler is configured to store within a buffer, a prediction bit along with the flagged instruction operation; and
   wherein the scheduler is further configured to inhibit issue of the given instruction operation that has been flagged until a status associated with the given instruction operation that has been flagged is good.

2. The processor as recited in claim 1, wherein the prediction unit includes a control unit configured to predict instruction replay.

3. The processor as recited in claim 2, wherein the prediction unit includes a replay history buffer including a plurality of entries, each entry corresponding to an instruction operation that is predicted to replay.

4. The processor as recited in claim 3, wherein each entry includes a counter configured to count a number of execution cycles during which the corresponding instruction operation has executed without a replay.

5. The processor as recited in claim 4, wherein the control unit is configured to clear the entry corresponding to the instruction operation in response to the counter exceeding a predetermined threshold value.

6. The processor as recited in claim 1, further comprising a reorder buffer coupled to the scheduler, wherein the reorder buffer is configured to notify the prediction unit that the given instruction operation status is good in response to receiving a done indication from the scheduler.

7. A method comprising:
   scheduling and issuing instruction operations for execution by an execution unit, and causing to be replayed, instruction operations that are determined to be incorrectly executed;
   predicting, prior to execution, whether a given instruction operation will replay, based upon an execution history of the given instruction operation, and providing an indication that the given instruction operation will replay;
   flagging the given instruction operation by asserting one or more instruction opcode bits of the given instruction operation in response to detecting the indication during instruction decoding;
   storing within a buffer, a prediction bit along with the flagged instruction operation; and
   inhibiting issue of the given instruction operation that has been flagged until a status associated with the given instruction operation that has been flagged is good.

8. The method as recited in claim 7, storing replay history within a replay history buffer including a plurality of entries, each entry corresponding to an instruction operation that is predicted to replay.

9. The method as recited in claim 8, further comprising counting, for each entry, a number of execution cycles during which the corresponding instruction operation has executed without a replay.

10. The method as recited in claim 9, clearing the entry corresponding to the instruction operation in response to the number of execution cycles exceeding a predetermined threshold value.

11. The method as recited in claim 7, further comprising issuing a done indication for the given instruction operation in response to the given instruction operation replaying correctly.

12. The method as recited in claim 11, further comprising providing a notification that the given instruction operation status is good in response to receiving a done indication.

13. A system comprising:
   a memory;
   a processor coupled to the memory, wherein the processor comprises:
      one or more execution units configured to execute instruction operations;

a scheduler coupled to the one or more execution units and configured to issue the instruction operations for execution by the one or more execution units, and to cause instruction operations that are determined to be incorrectly executed to be replayed;

a prediction unit configured to predict, prior to execution, whether a given instruction operation will replay, based upon an execution history of the given instruction operation, and to provide an indication that the given instruction operation will replay;

a decode unit coupled to the scheduler and configured to decode instructions, wherein in response to detecting the indication, the decode unit is further configured to flag the given instruction operation by asserting one or more instruction opcode bits of the given instruction operation;

wherein the scheduler is configured to store within a buffer, a prediction bit along with the flagged instruction operation; and wherein the scheduler is further configured to inhibit issue of the given instruction operation that has been flagged until a status associated with the given instruction operation that has been flagged is good.

14. The system as recited in claim 13, wherein the prediction unit includes a control unit configured to predict instruction replay.

15. The system as recited in claim 14, wherein the prediction unit includes a replay history buffer including a plurality of entries, each entry corresponding to an instruction operation that is predicted to replay.

16. The system as recited in claim 15, wherein each entry includes a counter configured to count a number of execution cycles during which the corresponding instruction operation has executed without a replay.

17. The system as recited in claim 16, wherein the control unit is configured to clear the entry corresponding to the instruction operation in response to the counter exceeding a predetermined threshold value.

18. The system as recited in claim 13, further comprising a reorder buffer coupled to the scheduler, wherein the reorder buffer is configured to notify the prediction unit that the given instruction operation status is good in response to receiving a done indication from the scheduler.

* * * * *